(12) United States Patent
Vandapel et al.

(10) Patent No.: US 10,264,431 B2
(45) Date of Patent: Apr. 16, 2019

(54) WORK SITE PERCEPTION SYSTEM

(71) Applicant: Caterpillar Inc., Peoria, IL (US)

(72) Inventors: Nicolas Vandapel, Pittsburgh, PA (US); Michael Happold, Pittsburgh, PA (US)

(73) Assignee: Caterpillar Inc., Deerfield, IL (US)

( * ) Notice: Subject to any disclaimer, the term of this patent is extended or adjusted under 35 U.S.C. 154(b) by 358 days.

(21) Appl. No.: 15/012,538

(22) Filed: Feb. 1, 2016

(65) Prior Publication Data
US 2017/0220009 A1 Aug. 3, 2017

(51) Int. Cl.
*H04W 4/80* (2018.01)
*H04W 4/70* (2018.01)

(52) U.S. Cl.
CPC ............... *H04W 4/80* (2018.02); *H04W 4/70* (2018.02)

(58) Field of Classification Search
CPC ............................................. G05D 2201/0202
USPC .......................................................... 701/50
See application file for complete search history.

(56) References Cited

U.S. PATENT DOCUMENTS

| | | | | |
|---|---|---|---|---|
| 5,646,844 | A * | 7/1997 | Gudat | E01C 19/004 701/409 |
| 6,037,901 | A | 3/2000 | Devier et al. | |
| 6,799,100 | B2 | 9/2004 | Burns et al. | |
| 7,330,112 | B1 * | 2/2008 | Emigh | B60R 25/1004 340/429 |
| 7,398,137 | B2 | 7/2008 | Ferguson et al. | |
| 7,747,369 | B2 | 6/2010 | Koerhrsen et al. | |
| 7,831,345 | B2 | 11/2010 | Heino et al. | |
| 8,195,358 | B2 * | 6/2012 | Anderson | G05D 1/0287 340/988 |
| 8,364,189 | B2 * | 1/2013 | Mintah | H04L 45/04 370/310 |
| 8,594,923 | B2 * | 11/2013 | Wong | G01C 21/206 701/409 |
| 9,858,817 | B1 * | 1/2018 | Bletzer | B60R 1/00 |
| 2006/0041845 | A1 | 2/2006 | Ferguson et al. | |
| 2007/0030212 | A1 * | 2/2007 | Shibata | G06T 5/50 345/9 |
| 2007/0129869 | A1 * | 6/2007 | Gudat | G05D 1/0297 701/50 |
| 2009/0140881 | A1 * | 6/2009 | Sakai | B60R 1/00 340/901 |

(Continued)

*Primary Examiner* — Min Huang
(74) *Attorney, Agent, or Firm* — Leydig, Voit & Mayer, Ltd.

(57) ABSTRACT

A short range peer-to-peer communications system includes a first perception sensor and a first peer-to-peer communications system on a first machine and a second perception sensor and a second peer-to-peer communications system on a second machine. A first controller generates a first electronic map of a first perceived work environment associated with the first machine and transmits first data associated with first electronic map to the second machine through the first peer-to-peer communications system. A second controller generates a second electronic map of the second perceived work environment associated with the second machine based upon the plurality of second raw data points, receives the first data from the first machine through the second peer-to-peer communications system, and supplements the second electronic map based upon the first data.

13 Claims, 6 Drawing Sheets

(56) References Cited

U.S. PATENT DOCUMENTS

| | | | |
|---|---|---|---|
| 2012/0083982 A1* | 4/2012 | Bonefas | G05D 1/0223 |
| | | | 701/70 |
| 2012/0133546 A1* | 5/2012 | Reiter | G01S 7/12 |
| | | | 342/59 |
| 2014/0149039 A1* | 5/2014 | Nettleton | G01C 15/00 |
| | | | 702/5 |
| 2015/0361642 A1* | 12/2015 | Stratton | G05D 1/0274 |
| | | | 701/461 |
| 2017/0096103 A1* | 4/2017 | Clamont Bello | B60Q 9/002 |
| 2017/0358159 A1* | 12/2017 | Hanson | G07C 9/00309 |
| 2018/0121740 A1* | 5/2018 | Boss | G06K 9/00805 |

* cited by examiner

WORK SITE PERCEPTION SYSTEM

TECHNICAL FIELD

This disclosure relates generally to work site perception systems, and more particularly, to a system that directly shares perception information between adjacent machines.

BACKGROUND

Movable machines such as rotary drills, haul trucks, dozers, motor graders, excavators, wheel loaders, and other types of equipment are used to perform a variety of tasks. For example, these machines may be used to move material and/or alter work surfaces at a work site. The machines may perform operations such as drilling, digging, loosening, carrying, etc., different materials at the work site.

Machines may be equipped with a perception system for mapping, detecting, and/identifying the working environment and obstacles at the work site. For any of a variety of reasons, the perception system may be limited in its effectiveness. For example, perception sensors used with the machines may have limited range or obstacles may be positioned near a machine that blocks or limits the operation of the perception system.

U.S. Pat. No. 8,195,358 discloses a system in which information received from sensors on different vehicles is shared through a network including a back office system. When operating in an area of diminished detection range, a vehicle may slow its speed and request data from another vehicle.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a short range peer-to-peer communications system for communicating between machines includes a first machine having a first ground engaging drive mechanism to propel the first machine, a first position sensor associated with the first machine for generating first position signals indicative of a position of the first machine, a first perception sensor associated with the first machine for generating a plurality of first raw data points reflective of a first perceived work environment associated with the first machine, and a first peer-to-peer communications system on the first machine. A first controller is configured to determine the position of the first machine based upon the first position signals, generate a first electronic map of the first perceived work environment associated with the first machine based upon the plurality of first raw data points, and transmit first data associated with first electronic map to the second machine through the first peer-to-peer communications system. A second machine has a second ground engaging drive mechanism to propel the second machine, a second position sensor associated with the second machine for generating second position signals indicative of a position of the second machine, a second perception sensor associated with the second machine for generating a plurality of second raw data points reflective of a second perceived work environment associated with the second machine, and a second peer-to-peer communications system on the second machine. A second controller is configured to determine the position of the second machine based upon the second position signals, generate a second electronic map of the second perceived work environment associated with the second machine based upon the plurality of second raw data points, receive the first data from the first machine through the second peer-to-peer communications system, and supplement the second electronic map based upon the first data.

In another aspect, a method of communicating between mobile machines at a work site includes propelling a first machine about the work site with a first ground engaging drive mechanism, determining a position of a first machine based upon first position signals from a first position sensor, generating a first electronic map of a first perceived work environment associated with the first machine based upon a plurality of first raw data points from a first perception sensor, and transmitting first data associated with first electronic map to a second machine through a first peer-to-peer communications system. The method further includes propelling a second machine about the work site with a second ground engaging drive mechanism, determining a position of the second machine based upon second position signals from a second position sensor, generating a second electronic map of a second perceived work environment associated with the second machine based upon a plurality of second raw data points from a second perception sensor, receiving the first data from the first machine through a second peer-to-peer communications system, and supplementing the second electronic map based upon the first data.

DETAILED DESCRIPTION

Figure 1:
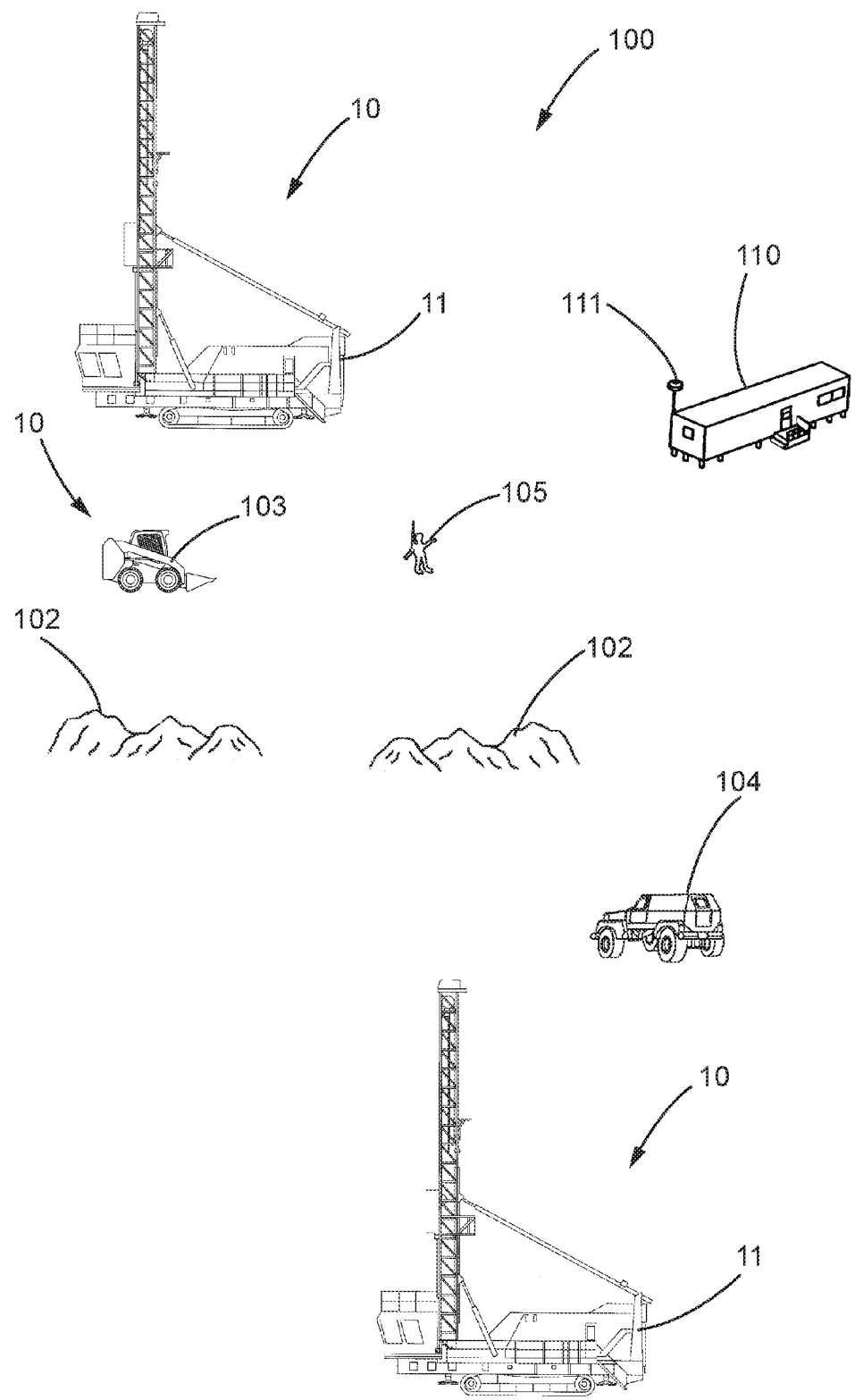
FIG. 1 is a schematic view of a work site at which a machine incorporating the principles disclosed herein may be used.

FIG. 1 illustrates an exemplary work site 100 with machines 10 operating at the work site. Work site 100 may include, for example, a mine site, a landfill, a quarry, a construction site, a road work site, or any other type of work site. Machines 10 may perform any of a plurality of desired operations or tasks at work site 100, and such operations or tasks may require the machine to generally traverse work site 100. Any number of machines 10 may simultaneously and cooperatively operate at work site 100, as desired. As depicted in FIG. 1, two machines 10 are depicted as rotary drill machines but may embody any type of machine including dozers, excavators, haul trucks, and any other machine capable of moving about a work site 100.

Machines 10 may be configured to be operated autonomously, semi-autonomously, or manually. When operating semi-autonomously or manually, machine 10 may be operated by remote control and/or by an operator physically located within an operator station 17 of the machine. As used herein, a machine 10 operating in an autonomous manner operates automatically based upon information received from various sensors without the need for human operator input. A machine 10 operating semi-autonomously includes an operator, either within the machine or remotely, who performs some tasks or provides some input and other tasks are performed automatically and may be based upon information received from various sensors. A machine 10 being operated manually is one in which an operator is controlling all or essentially all of the functions of the machine. A machine 10 may be operated remotely by an operator (i.e., remote control) in either a manual or semi-autonomous manner.

In addition to the machines operating at work site 100, various types of obstacles may be located at the work site. The obstacles may embody any type of object including those that are fixed or stationary as well as those that are movable or that are moving. Examples of fixed obstacles may include mounds of material 102, infrastructure, storage, and processing facilities, buildings such as command center 110, trees, and other structures and fixtures found at a work site 100. Examples of movable obstacles include other machines such as skid steer loaders 103, light duty vehicles 104, personnel 105, and other objects that may move about work site 100.

Figure 2:
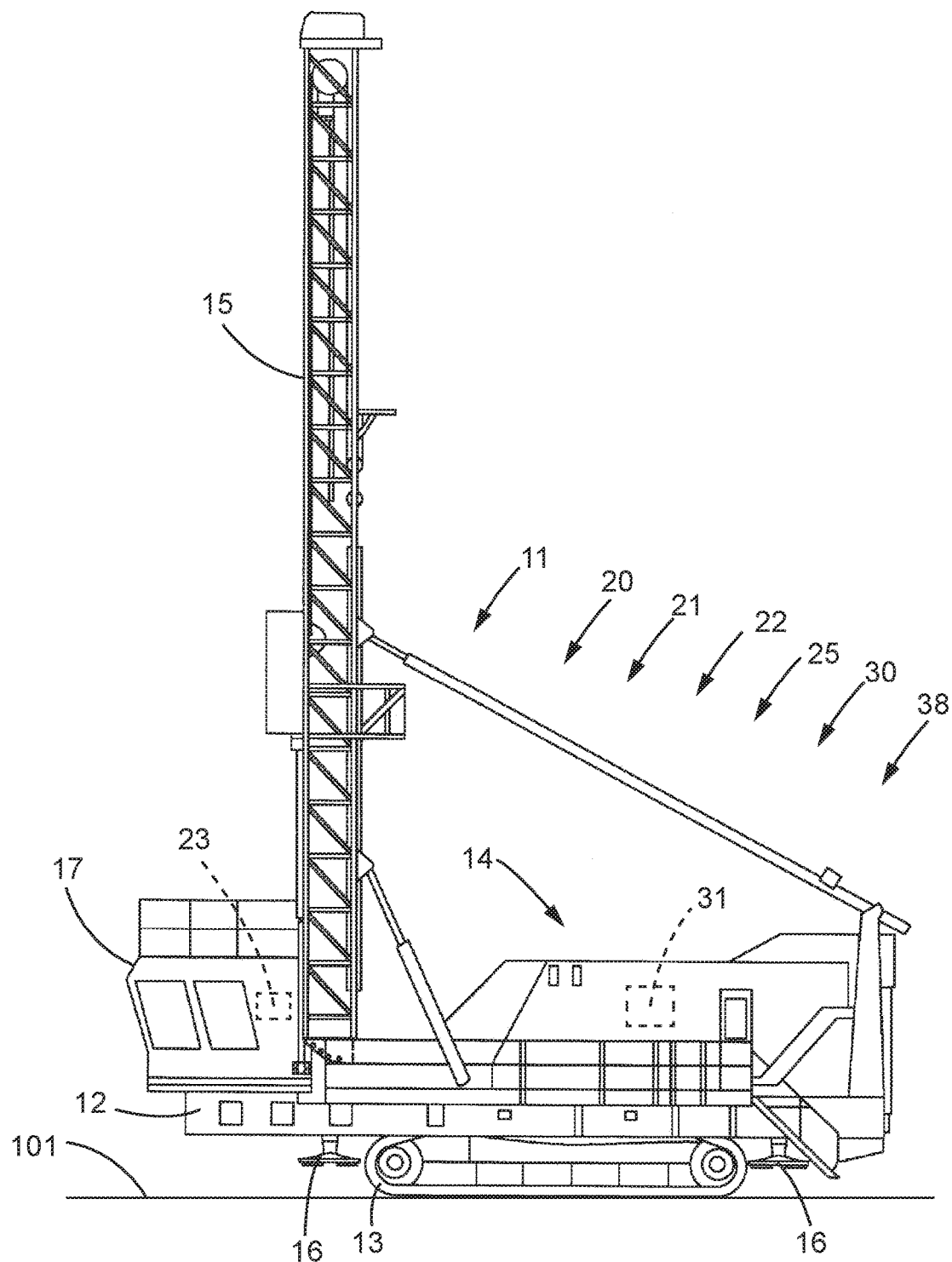
FIG. 2 is a diagrammatic view of a machine in accordance with the disclosure.

Referring to FIG. 2 as an example of a machine 10, rotary drill machine 11 may include a frame 12 supported on a ground engaging drive mechanism such as tracks 13 that are operatively connected to a propulsion system generally indicated at 14 by an arrow indicating association with the machine 10 for propelling the machine about the work site 100. The rotary drill machine 11 further includes a mast 15 pivotably mounted on the frame 12 and movable between a vertical drilling position, as depicted in FIG. 2, and a horizontal transport position (not shown). During a drilling operation, the rotary drill machine 11 may be raised above the work surface 101 and supported on jacks 16. Rotary drill machine 11 may include a cab or operator station 17 that an operator may physically occupy and provide input to operate the machine.

Machine 10 may include a control system 20, as shown generally by an arrow in FIG. 2 indicating association with the machine. The control system 20 may utilize one or more sensors to provide data and input signals representative of various operating parameters of the machine 10 and the environment of the work site 100 at which the machine is operating. The control system 20 may include an electronic control module or controller 21, as shown generally by an arrow in FIG. 2 indicating association with the machine, and a plurality of sensors associated with the machine 10.

The controller 21 may be an electronic controller that operates in a logical fashion to perform operations, execute control algorithms, store and retrieve data and other desired operations. The controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 21 such as power supply circuitry, signal conditioning circuitry, driver circuitry, and other types of circuitry.

The controller 21 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 21 may be implemented in hardware and/or software without regard to the functionality. The controller 21 may rely on one or more data maps relating to the operating conditions and the operating environment of the machine 10 and the work site 100 that may be stored in the memory of controller. Each of these data maps may include a collection of data in the form of tables, graphs, and/or equations.

The control system 20 and controller 21 may be located on the machine 10 as an on-board control system 22, as shown generally by an arrow in FIG. 2 indicating association with the machine, with an on-board controller 23, or may be distributed with components also located remotely from the machine such as at a command center 110 (FIG. 1). The functionality of control system 20 may be distributed so that certain functions are performed at machine 10 and other functions are performed remotely. In one example, the control system 20 may include a communications system such as wireless network system 111 (FIG. 1) for transmitting signals between the machine 10 and a system located remote from the machine such as at the command center.

The control system 20 may also or alternatively include a short-range machine-to-machine or peer-to-peer communications system indicated generally at 25. Peer-to-peer communications system 25 may include components to enable each machine 10 to send and receive signals to and from other machines over a relatively short distance without the need for a network node remote from the machines.

Figure 3:
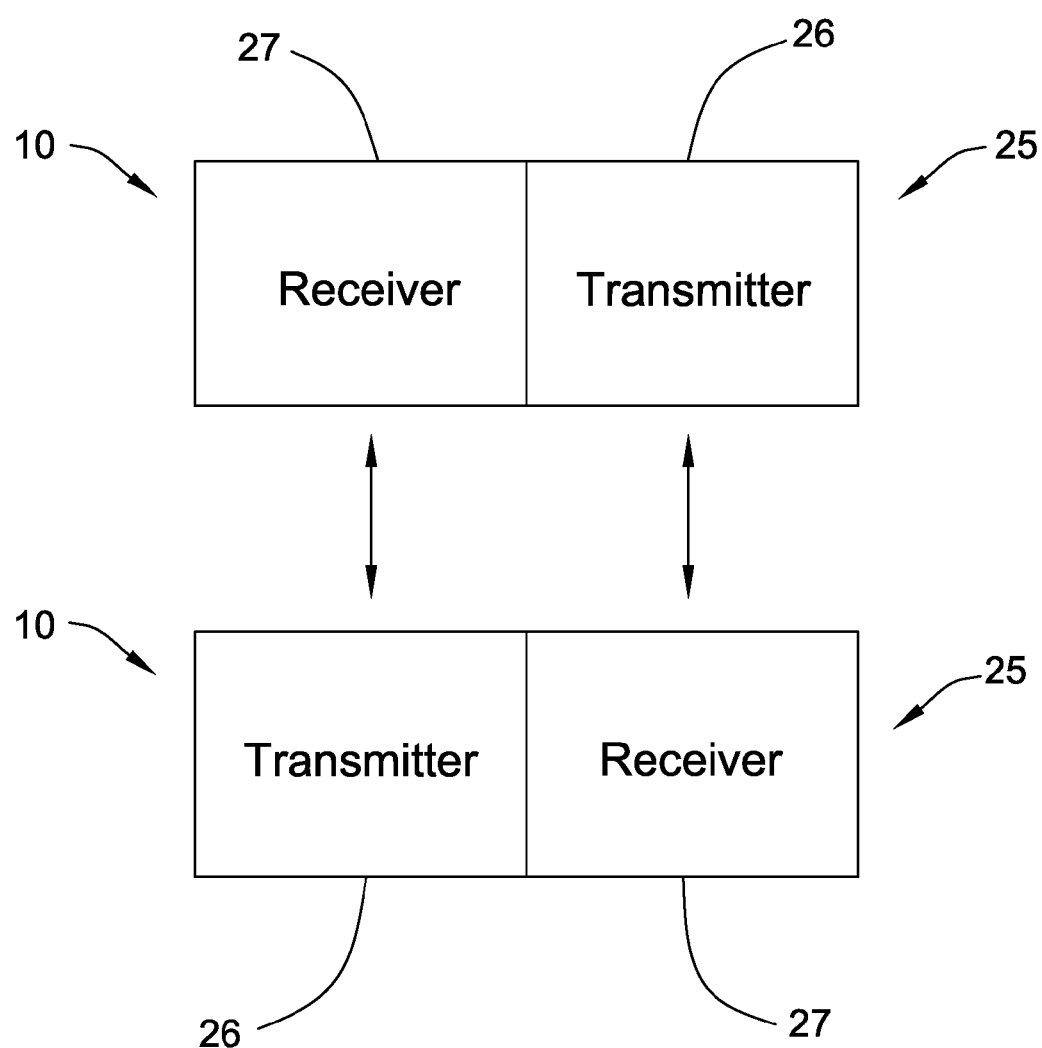
FIG. 3 is a schematic view of a wireless communications system.

In one embodiment depicted in FIG. 3, each peer-to-peer communications system 25 may include a peer-to-peer transmitter system 26 for transmitting signals from one peer-to-peer communications system and a peer-to-peer receiver system 27 for receiving signals from a peer-to-peer transmitter system of another peer-to-peer communications system. In some instances, the peer-to-peer transmitter system 26 and the peer-to-peer receiver system 27 may be combined as a transceiver system.

Peer-to-peer communications system 25 may implement any desired protocol including any of a plurality of communications standards. The desired protocols will permit communication between machines over a relatively short distance without the need for a network node or network access point remote from the machines. Systems that include a network node or access point may include network nodes or access points located or positioned on one of the machines between which communication is being effected in order to reduce latency and simplify the system.

In one example, the peer-to-peer communications systems 25 may utilize a wireless personal area network such as Bluetooth® LE ("Bluetooth® Smart") or another personal area network or a local area network such as IEEE 802.11b, 802.11g, 802.11p, 802.15.4, WiFi Direct, or LTE Direct. In a system utilizing a Bluetooth® Smart system or protocol, the peer-to-peer communications systems 25 may operate to automatically pair the communications systems of two machines 10 and then transmit signals directly between the peer-to-peer communications systems of the machines. In another embodiment, one of the machines 10 may include a network node with which each peer-to-peer communications system 25 may communicate. In still another example, a network node may be activated on one of the peer-to-peer communications systems 25 and the peer-to-peer communications systems communicate through the network node.

Other communications systems and configurations are contemplated. For example, machines 10 may communicate with each other through the peer-to-peer communications system 25 as well as communicate with the command center 110 through wireless network system 111.

Referring back to FIG. 2, machine 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 30, as shown generally by an arrow in FIG. 2 indicating association with the machine 10, may include a position sensor 31 that is operative to sense the position (which includes the orientation) of the machine relative to the work site 100. The position sensor 31 may include a plurality of individual sensors that cooperate to generate and provide position signals to controller 21 indicative of the position of the machine 10. In one example, the position sensor 31 may include one or more sensors that interact with a positioning system such as a global navigation satellite system or a global positioning system to operate as a position sensor. The controller 21 may use position signals from the position sensor 31 to determine the position of the machine 10 within work site 100. In other examples, the position sensor 31 may embody other systems such as lasers, sonar, or radar to determine all or some aspects of the position of machine 10.

Figure 4:
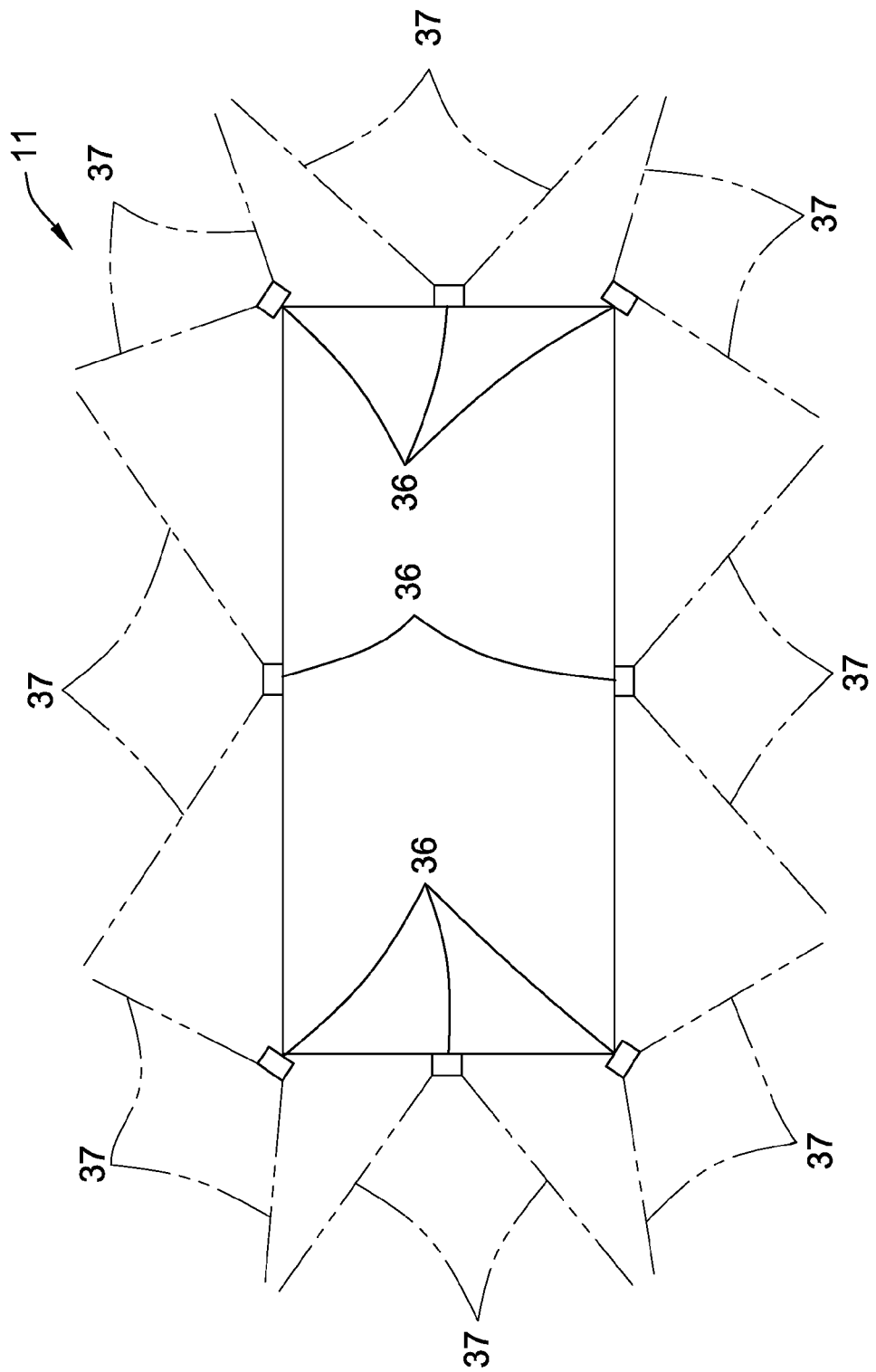
FIG. 4 is a schematic top plan view of the machine of FIG. 2.

To facilitate operation of the machine 10 as well as reduce the likelihood of a collision between the machine and an obstacle and between machines, a perception system 35 may be mounted on or associated with the machine, as shown generally by an arrow in FIG. 4 indicating association with the machine. The perception system 35 may include one or more systems such as a radar system, a SONAR system, a LIDAR system, a camera vision system, and/or any other desired system that operate with associated perception sensors 36. Perception sensors 36 may generate data that is received by the controller 21 and used by the controller to determine the position of the work surface 101 and the presence and position of obstacles within the range of the sensors. The field of view of each perception sensor 36 is depicted schematically in FIG. 4 by reference number 37.

The perception system 35 may be used to generate an electronic map and/or images of the environment around machine 10. The perception system 35 may include a plurality of perception sensors 36 mounted on the machine 10 for generating perception data from a plurality of points of view relative to the machine 10. Each perception sensor 36 may be mounted on the machine 10 at a relatively high vantage point. As depicted schematically in FIG. 4, eight perception sensors 36 are provided that record or sense images in the forward and rearward directions as well as to each side of machine 10. The perception sensor 36 may be positioned in other locations as desired. Controller 21 may receive perception data from the perception sensors 36 and generate video and/or still images based upon such perception data.

Figure 5:
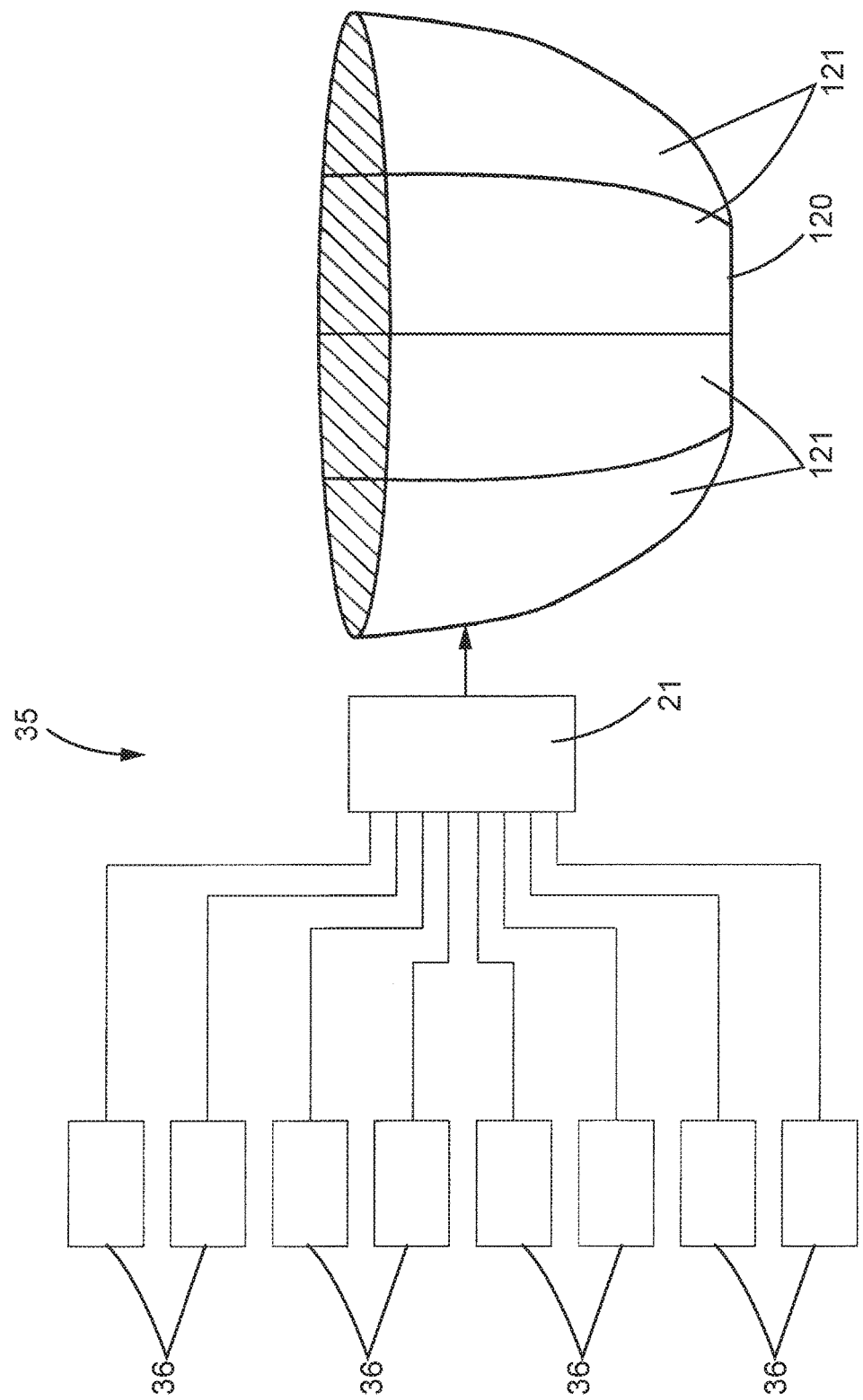
FIG. 5 is a schematic view of a perception system generating an unified image in accordance with the disclosure.

In some embodiments, controller 21 may combine the raw data points captured by the perception sensors 36 into a unified image 120 of a portion of the work site 100 adjacent and surrounding the machine 10. FIG. 5 is a pictorial illustration of one example of controller 21 combining image data from each of the perception sensors 36 to generate the unified image 120 of the perceived work environment associated with the machine 10. The unified image 120 may represent all image data available for the environment adjacent machine 10. In one example, the unified image 120 represents a 360-degree view or model of the environment of machine 10, with machine 10 at the center of the 360-degree view. According to some embodiments, the unified image 120 may be a non-rectangular shape. For example, the unified image 120 may be hemispherical and machine 10 may be conceptually located at the pole, and in the interior, of the hemisphere.

Controller 21 may generate the unified image 120 by mapping raw data points captured by the perception sensors 36 to an electronic or data map. The electronic map may be divided into sections 121, with each section corresponding to one set of raw data points. The mapping may correlate a two dimensional point from a perception sensor 36 to a three dimensional point on the map used to generate the unified image 120. For example, a raw data point of the image data located at (1, 1) may be mapped to location (500, 500, 1) of the unified image. The mapping may be accomplished using a look-up table that may be stored within controller 21. The look-up table may be configured based on the position and orientation of each perception sensor 36 on machine 10. Other methods for mapping image data may be used as desired.

Perception system 35 may also include an object identification system, generally indicated at 38, if desired. The object identification system 38 may operate to differentiate and store within the electronic map categories of objects detected such as machines, light duty vehicles, personnel, or fixed objects. In some instances, the object identification system 38 may operate to further identify and store the specific object or type of object detected. The object identification system 38 may be any type of system that determines the type of object that is detected. In one embodiment, the object identification system 38 may embody a computer vision system that uses edge detection technology to identify the edges of the detected object and then matches the detected edges with known edges contained within a data map or database to identify the object detected. Other types of object identification systems and methods of object identification are contemplated. In addition to identifying objects, the perception system 35 may also determine the speed and direction, or velocity, of objects that have been identified by the object identification system 38.

The perception sensors 36 may include and/or be associated with a timing device or element (not shown) to establish or compute a time designation for each data point or signal. The time designation may be associated with or appended to each raw data point to maintain a record as to when each data point or signal was generated. The time designation may be measured relative to any desired system such as Greenwich Mean Time, or another type of time measurement system. As a result, the data within the unified or electronic map may further include the time at which the data was collected. For example, data for each point may be stored in the form of x, y, z, and t where x, y, and z correspond to Cartesian coordinates and t is the time of the data collection. The unified map may also include one or more additional attributes such as the color of a particular location, if desired.

The electronic map associated with each machine 10 may thus include raw data points reflective of the perceived work environment, data reflective of the unified image created by the controller 21, and/or the identity and location of one or more objects. In addition, the electronic map associated with each machine 10 may include blind zones or areas of limited information or visibility. For example, in some instances, the fields of some or all of the perception sensors 36 may be limited so as not to cover or extend fully about the machine 10 or only extend a limited distance in one or more directions. This may be due to limitations in the range or capabilities of the perception sensors 36, the software associated with the sensors, and/or the positioning of the sensors. In addition, obstacles or the terrain at the work site 100 near or in proximity to the machine 10 may cause the blind zones. The blind zones may be set within controller 21 such was when they are caused by the position of the perception sensors 36 or limitations in the range of the sensors. In other instances, a blind zone may be determined based upon a lack of data. The lack of data may be based upon a lack of raw data points, intermittent updates of the data, or any other rationale.

In order to improve the safety and performance of the operation of machines 10, the machines may share information from their electronic maps through the use of their peer-to-peer communications systems 25. In one example, each machine may store an electronic map on-board and continuously share the on-board electronic map with adjacent machines. In doing so, a first machine may transmit all or a portion of its electronic map to a second machine and the second machine may add to or supplement its on-board electronic map. The second machine may use the data received from the first machine to extend the range of the electronic map in certain directions, to reduce blind zones, and to confirm data within the electronic map of the second machine. The data transmitted may be raw data points, data reflective of the work environment and/or the identity and location of various objects. In some instances, the velocity of various objects may also be transmitted.

In another example, a machine 10 (e.g., the second machine) may be configured to request electronic map information from another machine (e.g., the first machine) in conjunction with or prior to proposed movement into or towards a blind zone. In such case, the information transmitted may be limited to that in and around the blind zone. By limiting the information being transmitted, the transmission and processing of the information may be simplified and response times reduced. In some situations, the request for data from the first machine may be made only as part of a process of determining a movement command into or towards a blind zone.

In still another example, a machine 10 (e.g., a first machine) may transmit information to another machine (e.g., a second machine) if the first machine identifies an obstacle that is moving towards the second machine. In some instances, the first machine 10 may determine the distance between the first machine and the second machine and only transmit the data when the distance is less than a threshold distance. In some situations, the transmission of data may occur only upon determining that the object is moving towards the second machine.

Figure 6:
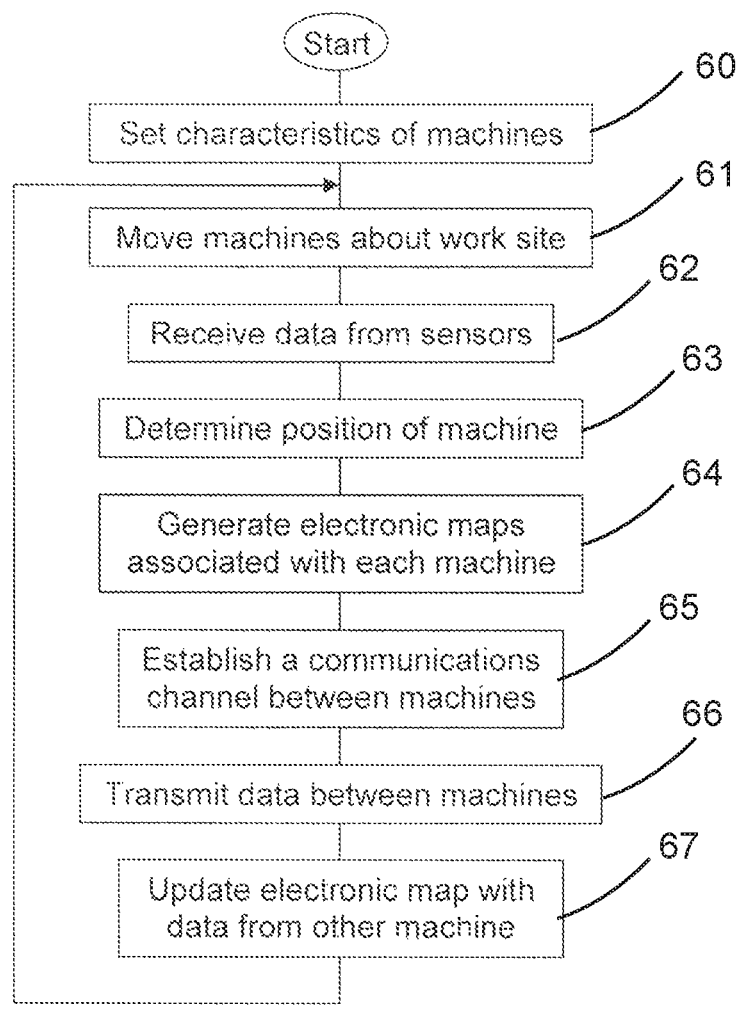
FIG. 6 is a flowchart of a process of supplementing an electronic map in accordance with the disclosure.

Referring to FIG. 6, a process for operating machines 10 at work site 100 is depicted. Initially, the characteristics of the machines 10 may be set or stored within the controller 21 of each machine at stage 60. The characteristics may include the designation of physical locations as blind zones as well as data density or data age that will also constitute a blind zone. At stage 61, the machines 10 may be positioned at and moved about the work site 100. In doing so, the controller 21 of each machine may receive at stage 62 data from the sensors associated with the machine 10 including the position sensors 31 and the perception sensors 36. The controller 21 for each machine 10 may determine at stage 63 the position of the machine 10 based upon the position signals from the position sensors 31.

At stage 64, the controller 21 for each machine may utilize the perception data from the perception sensors 36 of the machine to generate an electronic map of the area surrounding or adjacent the machine 10. The electronic map may include images and other data captured by the perception sensors 36, as well as metadata including the capture time and other parameters associated with each of sensors. The electronic map may be stored on-board the machine 10 within on-board controller 23.

The peer-to-peer communications system 25 of each machine 10 may establish at stage 65 a communications channel with an adjacent machine through its peer-to-peer communications system. In one example in which the peer-to-peer communications systems 25 use a Bluetooth® Smart system or protocol, a machine 10 may be operating in a "master" or "advertising" mode in which it is searching for one or more other machines that are in "slave" or "scanner" mode. Upon the relative distance between the machine 10 and another machine becoming sufficiently small (i.e., being within the range of the peer-to-peer communications systems 25), the peer-to-peer communications systems of the two machines will establish a communications channel or connection or become "paired" and permit machine-to-machine communications without the need for communication through an external node.

At stage 66 the peer-to-peer communications system 25 of the adjacent machines 10 may transmit all or part of the electronic maps contained within the on-board controller 23 to adjacent machines. The controllers 21 of the adjacent machines 10 may then utilize the portion of the electronic map received from the other machine to update or supplement the electronic map stored within its on-board controller 23. In other words, each machine 10 may share all or part of its electronic map with machines that are within range of the peer-to-peer communications systems 25. The controller 21 of each machine 10 may use the portions of the electronic maps or maps received from other machines to update or supplement the electronic map stored within the on-board controller 23 at stage 67. The portions of the electronic maps from the other machines 10 may be used to reduce or eliminate blind zones, extend the range of the electronic map associated with each machine 10, and/or any other desired purpose. Stages 61-67 may be repeated as the machines 10 continue to move about the work site 100.

In another aspect, rather than sharing or transmitting the electronic map from one machine 10 to an adjacent machine based upon proximity between the machines, the controller 21 of a machine may be configured to analyze the blind zones of its electronic map and seek data from an adjacent machine 10 prior to moving into or towards the blind zone. For example, referring to FIG. 1, the mounds of material 102 may operate as obstructions that limit the field of view of each machine 10 and thus create a blind zone on the sides of the mounds opposite the machines.

Rather than permitting the machines 10 to move past the mounds of material 102 and into a blind zone, the controller 21 of each machine may seek or request information from another machine with a different vantage point relative to the mounds in order to update or supplement its electronic map and eliminate or reduce the blind zone. In such case, the processes of stages 60-65 may be performed on an ongoing basis but stages 66 and 67 only performed upon receiving or generating a command to move the machine 10 or a portion thereof into or towards a blind zone. In some instances, the machines 10 may not establish a communications channel prior to receiving or generating the movement command. By limiting the transmission of data between the machines 10 to those instances in which a machine will be moving into or towards a blind zone, the amount of necessary computing and communications resources may be reduced.

In still another aspect, the perception system 35 may identify movable objects at the work site 100 and track their movement including their speed and direction. The controller 21 of a machine may be configured to analyze movable objects within its electronic map and alert another machine if the movable object is moving towards that machine. For example, referring to FIG. 1, the light duty vehicle 104 may be moving from adjacent one machine 10 towards another machine. In such case, the light duty vehicle 104 may be within the field of view, and thus the electronic map, of the first machine but hidden from the second machine by the mounds of material 102 and thus be within the blind zone of the second machine.

The controller 21 of a machine 10 that includes an electronic map identifying a moving obstacle may be configured to transmit information regarding the moving obstacle to another machine towards which the obstacle is moving. The electronic map of the machine 10 towards which the moving obstacle is approaching may be updated and actions taken by the machine may be based upon the additional information contained within the updated electronic map. In such case, the processes of stages 60-67 may be followed but the only data transmitted between machines 10 at stage 66 may be that pertaining to the moving obstacle. As with the example relating to transmitting information prior to movement into or towards a blind zone, by limiting the transmission of data between the machines 10 to those instances in which an obstacle is moving towards another machine, the amount of necessary computing and communications resources may be reduced.

INDUSTRIAL APPLICABILITY

The industrial applicability of the system described herein will be readily appreciated from the foregoing discussion. The foregoing discussion is applicable to machines 10 that operate at a work site 100 at which obstacles may be present. The systems and processes disclosed herein may be used at a mining site, a landfill, a quarry, a construction site, a roadwork site, a forest, a farm, or any other area in which it is desired to improve the efficiency of a machine operation.

Machines 10 may be operated at the work site 100 and an electronic map of the portion of the work site adjacent the machine stored on-board the machine. All or portions of the electronic maps may be shared between machines through the use of peer-to-peer communications systems 25 on each machine. Regardless of whether the machines 10 are operated autonomously, semi-autonomously, or manually, sharing information between the machines may reduce the frequency of interruptions in operation since the size of blind zones associated with each machine may be decreased and the systems may have greater confidence in the data that make up the electronic maps.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A short range peer-to-peer communications system for communicating between machines, comprising:
   a first machine including:
      a first ground engaging drive mechanism to propel the first machine;
      a first position sensor associated with the first machine for generating first position signals indicative of a position of the first machine;
      a first perception sensor associated with the first machine for generating a plurality of first raw data points reflective of locations of a work surface and obstacles within a first perceived work environment associated with the first machine;
      a first peer-to-peer communications system on the first machine; and a first controller configured to:
      generate first movement commands to propel the first machine;
      determine the position of the first machine based upon the first position signals;
      generate a first electronic map of the locations of the work surface and obstacles within the first perceived work environment associated with the first machine based upon the plurality of first raw data points;
      transmit first data associated with first electronic map to the second machine through the first peer-to-peer communications system;
   a second machine including:
      a second ground engaging drive mechanism to propel the second machine;
      a second position sensor associated with the second machine for generating second position signals indicative of a position of the second machine;
      a second perception sensor associated with the second machine for generating a plurality of second raw data points reflective of locations of the work surface and obstacles within a second perceived work environment associated with the second machine;
      a second peer-to-peer communications system on the second machine; and
      a second controller configured to:
      determine the position of the second machine based upon the second position signals;
      generate a second electronic map of the locations of the work surface and obstacles within the second perceived work environment associated with the second machine based upon the plurality of second raw data points, the second electronic map including a blind zone;

generate a second movement command to propel the second machine towards the blind zone;

generate a request for information to supplement the second electronic map including information regarding the blind zone from the first machine prior to generating the second movement command;

receive the first data, from the first machine through the second peer-to-peer communications system; and supplement the second electronic map based upon the first data to reduce the blind zone; and wherein the first electronic man includes an object moving towards the second machine and the first controller transmits the first data to second machine upon determining that the object is moving towards second machine.

2. The system of claim 1, wherein the first data extends a range of the second electronic map in a first direction.

3. The system of claim 1, wherein the second controller is configured to request the first data only as part of determining the movement command.

4. The system of claim 1, wherein the first controller is configured to determine a distance between the first machine and the second machine and transmit the first data when the distance is less than a threshold distance.

5. The system of claim 1, wherein the first controller is configured to transmit the first data only upon determining the object is moving towards the second machine.

6. The system of claim 1, wherein the first data includes a location of a portion of the first perceived work environment from the first electronic map.

7. The system of claim 1, wherein the first data includes an identity of at least one object from first electronic map.

8. The system of claim 7, wherein the first data includes a velocity of movement of an object from the first electronic map.

9. The system of claim 1, wherein the first data includes a portion of the plurality of first raw data points reflective of the first perceived work environment.

10. A method of communicating between mobile machines at a work site, comprising;

propelling a first machine about the work site with a first ground engaging drive mechanism;

determining a position of a first machine based upon first position signals from a first position sensor;

generating a first electronic map of locations of the work surface and obstacles within a first perceived work environment associated with the first machine based upon a plurality of first raw data points from a first perception sensor associated with the first machine;

transmitting first data associated with first electronic map to a second machine through a first peer-to-peer communications system;

propelling a second machine about the work site with a second ground engaging drive mechanism;

determining a position of the second machine based upon second position signals from a second position sensor;

generating a second electronic map of locations of the work surface and obstacles within a second perceived work environment associated with the second machine based upon a plurality of second raw data points from a second perception sensor associated with the second machine, the second electronic map including a blind zone;

generating a request for information to supplement the second electronic map including information regarding the blind zone from the first machine prior to generating second movement commands to propel the second machine towards the blind zone;

receiving the first data from the first machine through a second peer-to-peer communications system;

supplementing the second electronic map based upon. the first data to reduce the blind zone; and further including determining that an object is moving towards the second machine and transmitting the first data second machine upon determining that the object is moving towards second machine.

11. The method of claim 10, further including requesting the first data only as part of determining, the movement command.

12. The method of claim 10, further including determining a distance between the first machine and the second machine and transmitting the first data when the distance is less than a threshold distance.

13. The method of claim 10, further including transmitting the first data only upon determining the object is moving towards the second machine.

* * * * *